United States Patent Office 2,858,340
Patented Oct. 28, 1958

2,858,340

1-N-BUTYLBORACYCLOHEXANE AND PROCESS FOR ITS PREPARATION

Sheldon L. Clark, Kenmore, and James R. Jones, Grand Island, N. Y., assignors, by mesne assignments, to Olin Mathieson Chemical Corporation, a corporation of Virginia No Drawing. Application June 21, 1956
Serial No. 592,994

2 Claims. (Cl. 260—606.5)

This invention relates to a new composition of matter, 1-n-butylboracyclohexane, and methods for its preparation.

The new composition of this invention has the general formula

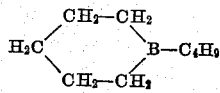

and has a boiling point of 60–62° C. at 10 mm. Hg. 1-n-butylboracyclohexane is useful as a chemical intermediate, as a welding fuel according to U. S. Patent 2,582,268, and also as a high energy fuel for jet engines as described in copending application Serial No. 533,944, filed September 13, 1955, of E. A. Weilmuenster and J. A. Zaslowsky. It can also be admixed with conventional jet fuels such as JP–4 in proportions of, for example, 10–20 percent by volume in order to increase their heats of combustion.

The 1-n-butylboracyclohexane of this invention is prepared by reacting a di-Grignard of 1,5-dibromopentane with di-n-butylchloroborane in ether solution and distilling 1-n-butylboracyclohexane from the reaction mixture. The reaction is preferably carried out at low temperatures of the order of 0° C.

The di-n-butylchloroborane reactant can be prepared according to the method described by Smith, J. E., and Kraus, C. A., in J. Am. Chem. Soc., Vol. 73, at page 2751 (1951). According to this method, tri-n-butylborane is first prepared by treating boron trichloride with n-butylmagnesium bromide. A practically quantitative yield of di-n-butylchloroborane can be obtained by then passing anhydrous hydrogen chloride through the tri-n-butylborane heated to 110° C.

The method of preparation of the new compounds is more fully illustrated in the following example.

Example

The di-Grignard of 1,5-dibromopentane was prepared from 12.0 grams (0.50 g-atom) of magnesium and 57.5 grams (0.25 mole) of 1,5-dibromopentane in the usual manner. The Grignard solution was added dropwise, with stirring, to 34.0 grams (0.21 mole) of cold di-n-butylchloroborane dissolved in an equal volume of ether. The mixture was stirred for one hour at 0° C. and then filtered through glass wool. Distillation, after ether removal, gave 15.3 grams of 1-n-butylboracyclohexane which had a boiling point of 60–62° C. at 10 mm. Hg. In addition, 20.5 grams of tri-n-butylborane was isolated.

The 1-n-butylboracyclohexane was analyzed and found to have a molecular weight of 138–144 and a boron content of 7.65–6.86 weight percent. These analyses compare favorably with a molecular weight of 138 and a boron content of 7.85 weight percent calculated for a compound of the empirical formula $C_9H_{19}B$.

We claim:

1. As a new composition, 1-n-butylboracyclohexane of the general formula

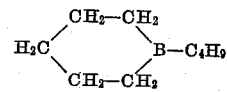

2. A method for the preparation of 1-n-butylboracyclohexane from di-n-butylchloroborane which comprises reacting a di-Grignard of 1,5-dibromopentane with di-n-butylchloroborane in ether solution and distilling 1-n-butylboracyclohexane from the reaction mixture.

References Cited in the file of this patent

UNITED STATES PATENTS

| | | |
|---|---|---|
| 2,160,915 | Schreiber | June 6, 1939 |
| 2,257,194 | Rosen | Sept. 30, 1941 |
| 2,446,008 | Hurd | July 27, 1948 |